(12) United States Patent
Fu

(10) Patent No.: US 7,538,927 B1
(45) Date of Patent: May 26, 2009

(54) MEMS MIRROR WITH SHORT VERTICAL COMB TEETH AND LONG IN-PLANE COMB TEETH

(75) Inventor: Yee-Chung Fu, Fremont, CA (US)

(73) Assignee: Advanced NuMicro Systems, Inc., San Jose, CA (US)

( * ) Notice: Subject to any disclaimer, the term of this patent is extended or adjusted under 35 U.S.C. 154(b) by 404 days.

(21) Appl. No.: 11/549,505

(22) Filed: Oct. 13, 2006

(51) Int. Cl.
*G02B 26/08* (2006.01)
*C23F 1/00* (2006.01)

(52) U.S. Cl. .............................. 359/223; 216/2; 216/24; 359/225; 359/290; 310/309

(58) Field of Classification Search .................... 216/2, 216/24, 72; 235/462.36, 462.38; 257/E25.03; 359/223–226, 290–291, 197–199; 310/309
See application file for complete search history.

(56) References Cited

U.S. PATENT DOCUMENTS

| | | | |
|---|---|---|---|
| 6,593,677 B2 * | 7/2003 | Behin et al. .................. | 310/309 |
| 6,595,055 B1 * | 7/2003 | Schenk et al. ............ | 73/514.15 |
| 6,744,173 B2 * | 6/2004 | Behin et al. .................. | 310/309 |
| 6,757,092 B2 * | 6/2004 | Abu-Ageel .................. | 359/290 |
| 6,769,616 B2 * | 8/2004 | Fu et al. ...................... | 235/454 |
| 6,985,279 B1 * | 1/2006 | Fu .............................. | 359/291 |
| 7,046,421 B1 * | 5/2006 | Fu .............................. | 359/291 |
| 7,459,093 B1 * | 12/2008 | Fu .............................. | 216/2 |
| 2005/0002084 A1 * | 1/2005 | Wan ........................... | 359/291 |
| 2005/0184351 A1 * | 8/2005 | Fu .............................. | 257/415 |

* cited by examiner

*Primary Examiner*—Burton Mullins
(74) *Attorney, Agent, or Firm*—Patent Law Group LLP; David C. Hsia

(57) ABSTRACT

A process for constructing a micro-electro-mechanical system (MEMS) device includes etching the topside of a wafer to form a first support layer having short stationary comb teeth extending from one or more support pads. The backside of the wafer is etched to form a top layer with a mirror, beam structures extending from the mirror, long rotating comb teeth extending from the beam structures, and long stationary comb teeth extending from stationary pads. The long rotating comb teeth are interdigitated in-plane with the long stationary comb teeth, and the long rotating comb teeth are interdigitated out-of-plane at their tips with the short stationary comb teeth. Asymmetry in the overlap between the long rotating comb teeth and the short stationary comb teeth allows the rotational direction of the mirror to be determined from capacitance measurements. Furthermore, the short stationary comb teeth can be used to initiate oscillation of the mirror.

24 Claims, 6 Drawing Sheets

MEMS MIRROR WITH SHORT VERTICAL COMB TEETH AND LONG IN-PLANE COMB TEETH

CROSS REFERENCE TO RELATED APPLICATIONS

This application is related to U.S. application Ser. No. 11/456,562, filed Jul. 10, 2006, which is incorporated herein by reference.

FIELD OF INVENTION

This invention relates to micro-electro-mechanical system (MEMS) devices, and more particularly to MEMS scanning mirrors.

DESCRIPTION OF RELATED ART

U.S. Pat. No. 6,595,055 discloses a micromechanical component having a frame layer and an oscillating body suspended in an opening in the frame layer. At least one lateral surface of the oscillating body is arranged in relation to at least one inner lateral surface of the opening so that a capacitance formed between them is varied by an oscillation of the oscillating body. This allows the oscillating body to be oscillated by periodically varying a voltage applied between the frame layer and the oscillating body.

The frame layer is mounted on a supporting wafer. The supporting wafer is implemented so that, in comparison to the influence of the voltage applied between the frame layer and the oscillating body, the supporting wafer has a negligible physical influence on the oscillation of the oscillating body.

SUMMARY

In one embodiment of the invention, a method for constructing a micro-electro-mechanical system (MEMS) device includes etching the topside of a first wafer to approximately half of its thickness to form a first support layer. The first support layer includes short stationary comb teeth that extend from one or more support pads. A second wafer may be etched to form a second support layer with a cavity through a recess for accommodating mobile elements in the first wafer. The first wafer is then turned upside down and bonded with the second wafer. The backside of the first wafer, which is the topside of the bonded structure, is etched to form the device layer with a mirror, beam structures extending from the mirror, long rotating comb teeth extending from the beam structures, and long stationary comb teeth extending from stationary pads. The long rotating comb teeth are interdigitated in-plane with the long stationary comb teeth. The long rotating comb teeth are also interdigitated out-of-plane at their tips with the short stationary comb teeth from below. Asymmetry in the overlap between the long rotating comb teeth and the short stationary comb teeth when the mirror is rotated in a first direction versus the overlap when the mirror is rotated in a second direction can be used to determine the rotation direction from capacitance measurements. Furthermore, the short stationary comb teeth can be used to initiate oscillation of the mirror.

BRIEF DESCRIPTION OF THE DRAWINGS

Use of the same reference numbers in different figures indicates similar or identical elements.

DETAILED DESCRIPTION OF THE INVENTION

In a typical conventional process for forming a MEMS device, the topside of a first wafer is etched to form part of the device, the backside of a second wafer is bonded on the topside of the first wafer, and the topside of the second wafer is etched to complete the device. The etching of the first wafer is aligned to fiduciary marks on the first wafer. The etching of the second wafer is also aligned to the fiduciary marks on the first wafer. Thus, there is no direct alignment between features on the first and the second wafers. Typically the features on the first and the second wafers have similar dimensions. Thus, both wafers are etched at the same rate to form those features.

In embodiments of the invention, a single silicon wafer is etched on both sides to form a device. This saves cost as only one wafer is used instead of two. This also improves yield since the process does not require fusion bonding between silicon wafers, which typically has a low yield.

In embodiments of the invention, a first surface of the silicon wafer is etched and then bonded to a surface of a glass wafer. A second surface of the silicon wafer is then etched by aligning features on the second surface with features on the first surface of the silicon wafer since the features on the first surface are visible through the glass wafer. This improves alignment between the features on both surfaces since they are directly aligned with each other.

In embodiments of the invention, the features on the glass wafer and on the first surface of the silicon wafer have larger dimensions than the features on the second surface of the silicon wafer. This allows different etching methods and etching rates to be used to speed up the manufacturing process.

Although certain dimensions are provided in the present disclosure, these dimensions may be varied to suit various mirror rotation angles, alignment tolerances, wafer thicknesses, and etching depths.

Figure 1A:
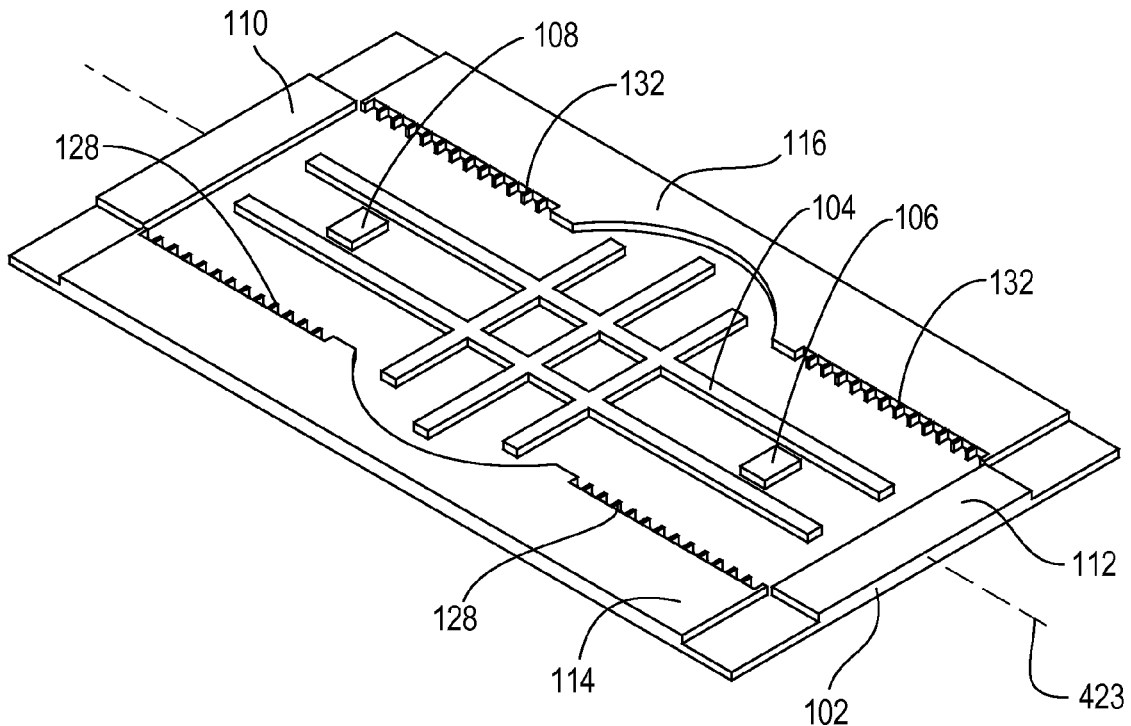
FIGS. 1A, 1B, 1C, 2, 3, and 4 illustrate processes for constructing a MEMS device with vertical and in-plane comb teeth from a silicon wafer and a glass wafer in one embodiment of the invention.
Figure 2:
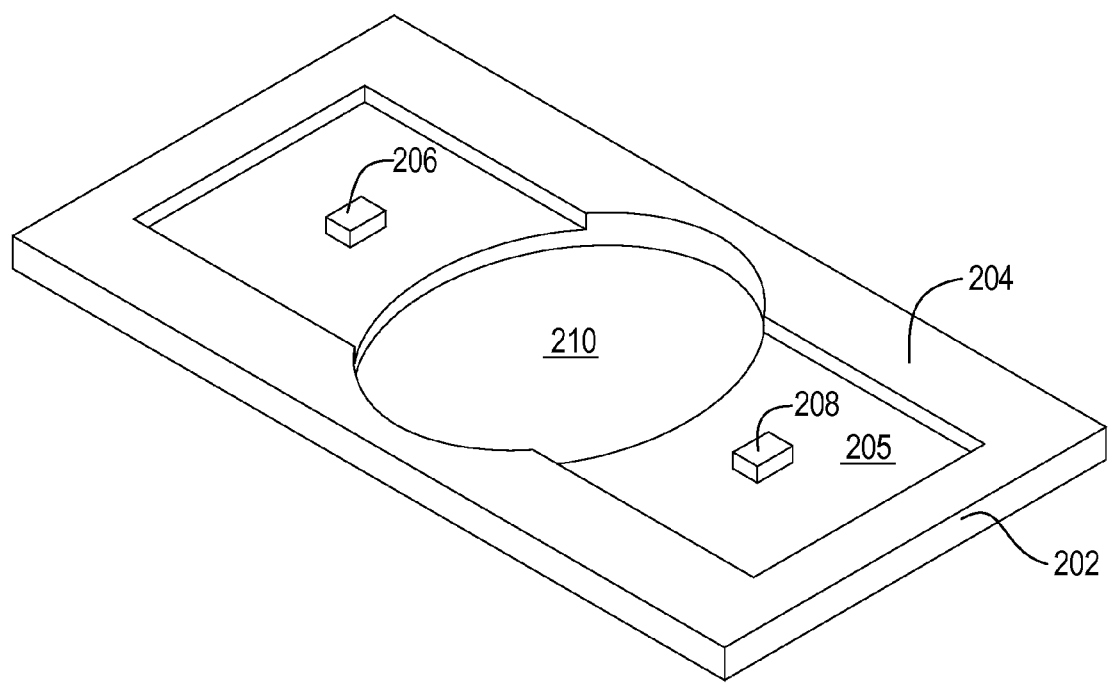

FIGS. 1A, 2, 3, and 4 illustrate a process for constructing a MEMS device 400 (FIG. 4) with vertical and in-plane comb teeth in one embodiment of the invention. In MEMS device 400, the topside of a silicon wafer 102 (FIG. 1A) is etched to form a first support layer with short stationary comb teeth. Silicon wafer 102 is then turned upside down and bonded with a glass wafer 202 (FIG. 2). Glass wafer 202 forms a second support layer that is transparent and nonconductive. The backside of silicon wafer 102, now the topside of the bonded structure, is then etched to form a device layer with a rotatable mirror and long in-plane and interdigitated comb teeth.

In FIG. 1A, the topside of silicon wafer 102 is etched to approximately half of its thickness to define the first support layer. After the etching, a thermal oxide layer is optionally formed over the topside of silicon wafer 102. The thermal oxide layer may act as an etch stop for a subsequent etching of the backside of silicon wafer 102. Silicon wafer 102 has a single silicon layer with an exemplary thickness of approximately 200 µm.

The first support layer includes spring pads 106, 108, 110, and 112, and support pads 114 and 116. The first support layer may include an optional stiffening structure 104 with crossbeams along the length of the device intersecting crossbeams along the width of the device. Stiffening structure 104 adds rigidity to a mirror 402 (FIG. 4) and beam structures 404 and 414 (FIG. 4) extending from mirror 402 to be formed on the backside of silicon wafer 102. Spring pads 106, 108, 110, and 112 at least partially overlap or substantially coincide with respective spring pads 422, 412, 408, and 418 (FIG. 4) to be formed on the backside of silicon wafer 102. Support pads 114 and 116 at least partially overlap or substantially coincide with respective stationary pads 430 and 434 (FIG. 4) to be formed on the backside of silicon wafer 102.

Support pad 114 is located on one side of a rotation axis 423. Short stationary comb teeth 128 extend from support pad 114 toward rotation axis 423. Support pad 116 is located on the other side of rotation axis 423. Short stationary comb teeth 132 extend from support pad 116 toward rotation axis 423. The length of short stationary comb teeth 128 is smaller than the length of short stationary comb teeth 132. This creates an asymmetry between (1) the overlap area of long rotating comb teeth 424/426 (FIG. 4) and short stationary comb teeth 128 when the mirror is rotated in a first direction (e.g., clockwise) and (2) the overlap area of long rotating comb teeth 424/426 and short stationary comb teeth 132 when the mirror is rotated in a second direction (e.g., counterclockwise). The asymmetry in the overlap areas allows a sensor to detect rotation direction in addition to rotation angle from capacitance measurements. Note the lengths of short stationary comb teeth 128 and 132 only need to be different enough to sense the rotation direction. Even if the overlap areas are symmetrical, short stationary comb teeth 128 and 132 can still be used to initiate oscillation.

Short stationary comb teeth 128 and 132 are shorter than in-plane rotating and stationary comb teeth to be formed on the backside of wafer 102. Furthermore, the number of short stationary comb teeth 128 and 132 may be less than the number of the long rotating and stationary comb teeth.

Short stationary comb teeth 128 and 132 need to be long enough to initiate oscillation and sense rotation angle and direction. At the same time, short stationary comb teeth 128 and 132 need to be short enough not to significantly impact the driving force provided by the long rotating and stationary comb teeth to be formed on the backside of wafer 102. In one embodiment, the length of short stationary comb teeth 128 and 132 is 5 to 20% of the length of the long rotating and stationary comb teeth. In one embodiment, the width of short stationary comb teeth 128 and 132 is smaller than the width of the long stationary comb teeth. This allows short stationary comb teeth 128 and 132 to fit within the footprint of the long stationary comb teeth and to be easily aligned with the long stationary comb teeth during fabrication.

Figure 1B:
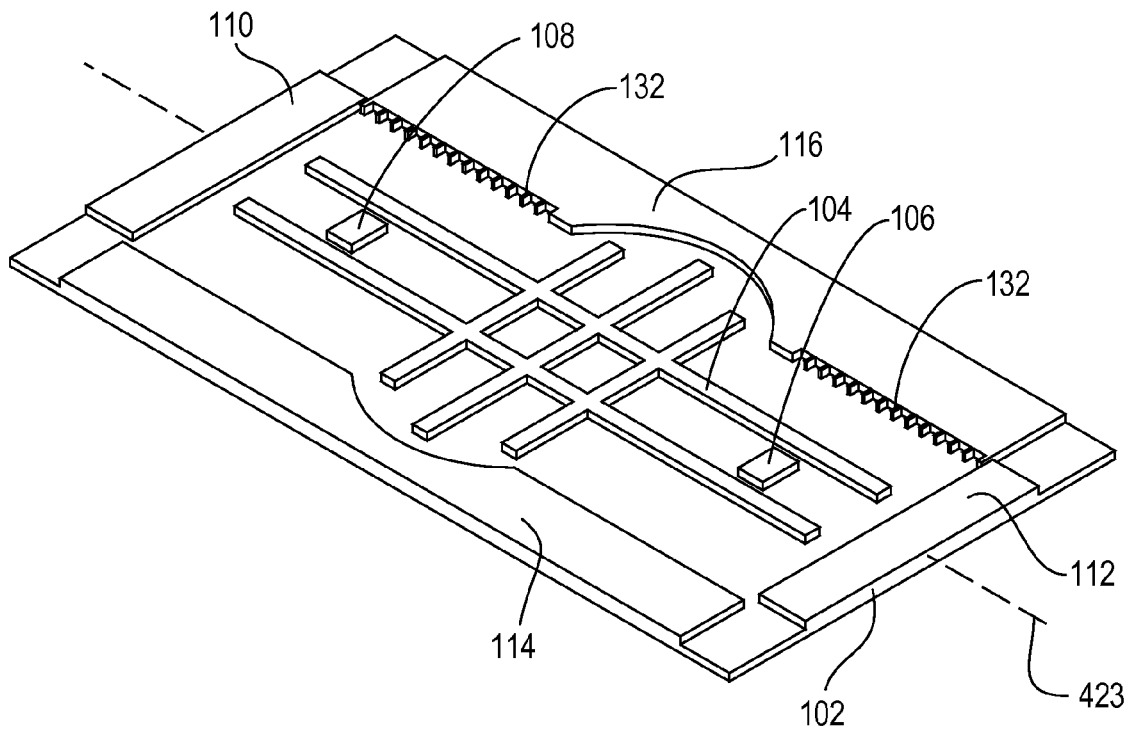

In an alternative embodiment illustrated in FIG. 1B, the first support layer of silicon wafer 102 only has short stationary comb teeth 132 but not short stationary comb teeth 128 to create the asymmetry in the first support layer relative to rotation axis 423. This setup also creates the asymmetry in the overlap areas so a sensor can detect rotation direction in addition to rotation angle from capacitance measurements.

Figure 1C:
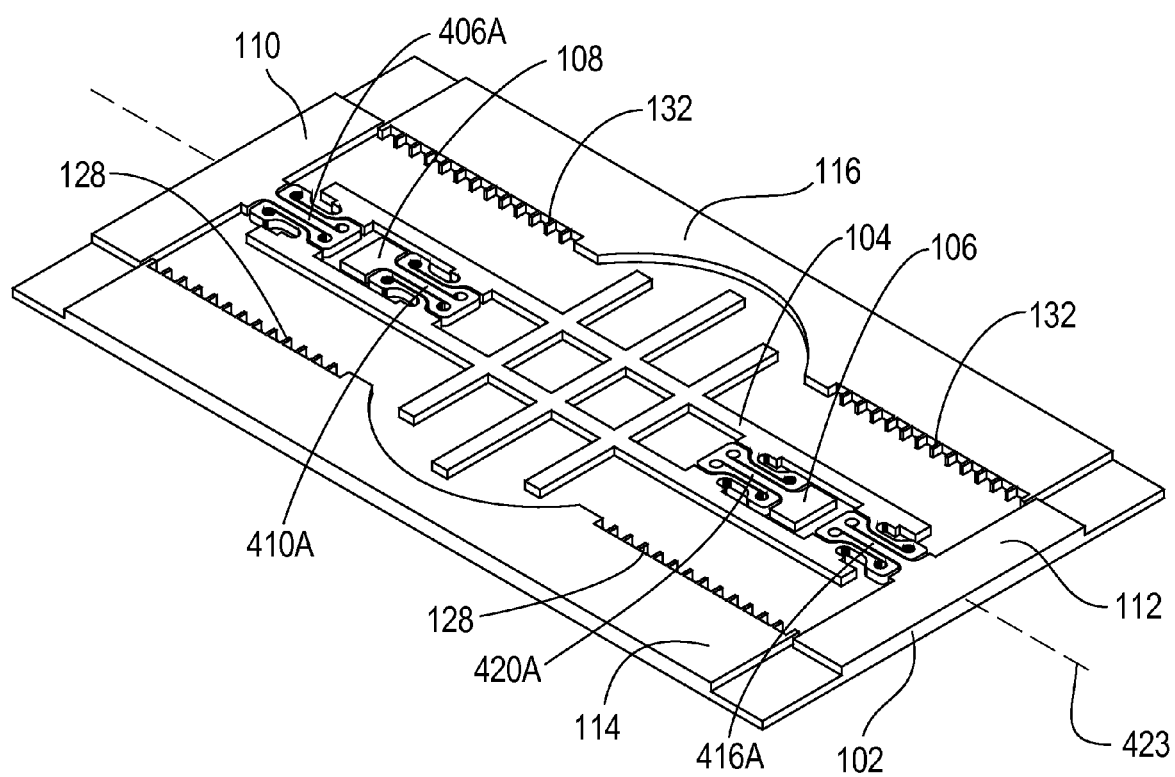

In another alternative embodiment illustrated in FIG. 1C, the first support layer of silicon wafer 102 has springs 406A, 410A, 416A, and 420A formed along rotation axis 423. Springs 406A, 410A, 416A, and 420A partially overlap or substantially coincide with respective springs 406, 410, 416, and 420 (FIG. 4) to be formed on the backside of wafer 102 to form thicker and stiffer springs overall. Spring 406A is connected between spring pad 110 and a beam structure 404 (FIG. 4) to be formed on the other side of wafer 102. Spring 410A is connected between spring pad 108 and beam structure 404. Spring 416A is connected between spring pad 112 and a beam structure 414 (FIG. 4) to be formed on the other side of wafer 102. Spring 420A is connected between spring pad 106 and beam structure 414. Springs 406A, 410A, 416A, and 420A may be connected to their respective beam structures through stiffening structure 104 or additional spring pads connected to the beam structures.

By design, features with larger (i.e., rougher) dimensions are placed on the topside of silicon wafer 102 while features with smaller (i.e., finer) dimensions are placed on the backside of silicon wafer 102. Thus, the features on the topside of silicon wafer 102 can be etched at a faster rate than the features on the backside of silicon wafer 102 to speed up the manufacturing process. For example, the pitch of short stationary comb teeth 128 and 132 are relatively large so that they can be etched at a fast rate along with the other features.

In one embodiment, the dimension that controls the etch rate of the topside of silicon wafer 102 is the distance between spring pad 106 or 108 and an adjacent crossbeam from stiffening structure 104, which is about 100 µm. In one embodiment, the features on the topside of silicon wafer 102 are etched more than 2 times faster than the features on the backside of silicon wafer 102.

In FIG. 2, the topside of glass wafer 202 is processed to define the second support layer on top of which the first support layer is to be bonded. The second support layer includes a generally rectangular recess 205 that defines a support pad 204 that forms a frame around the perimeter of glass wafer 202. Additional support pads 206 and 208 are formed in recess 205. A mirror cavity 210 is formed through glass wafer 202 near the center of recess 205. Less refined processes, including sandblasting, laser cutting, wet etching, and dry etching can be used to process glass wafer 202 since it has rough features compared to the features on silicon wafer 102.

Figure 3:
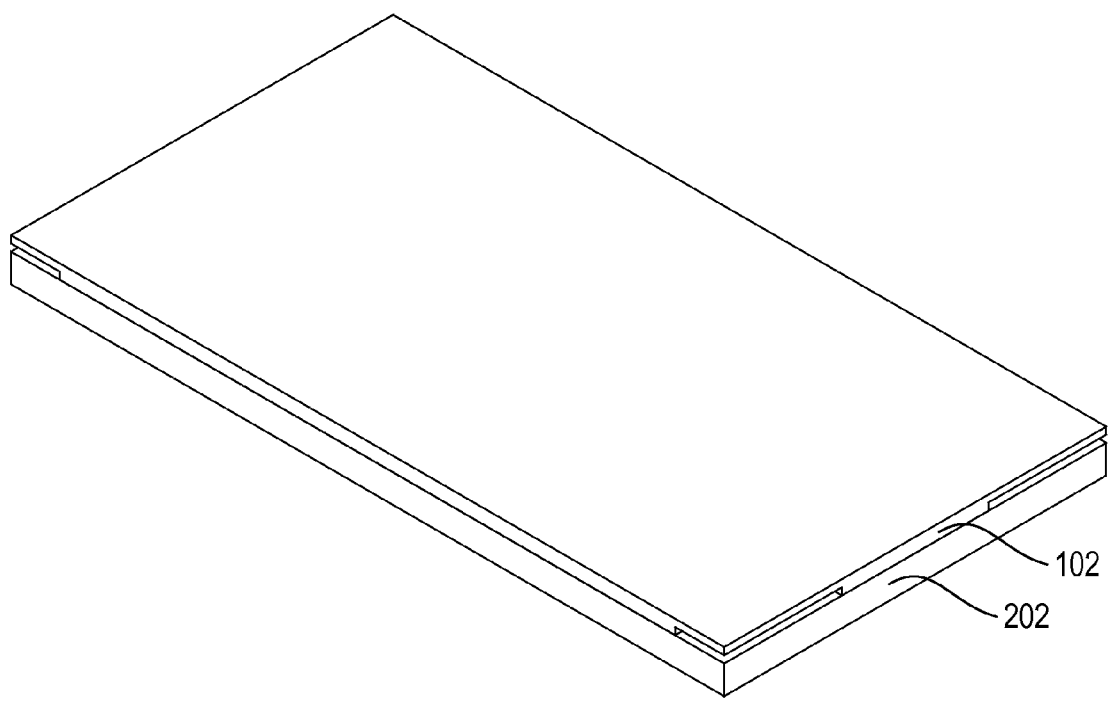

In FIG. 3, silicon wafer 102 is turned upside down and the topside of silicon wafer 102 is bonded to the topside of glass wafer 202. Specifically, pads 110, 112, 114 and 116 of silicon wafer 102 are bonded to pad 204 of glass wafer 202. Furthermore, pads 106 and 108 of silicon wafer 102 are bonded to pads 206 and 208 of glass wafer 202. Pads 206 and 208 of glass wafer 202 are made generally larger than pads 106 and 108 of silicon wafer 102 so that they can be easily aligned.

Figure 4:
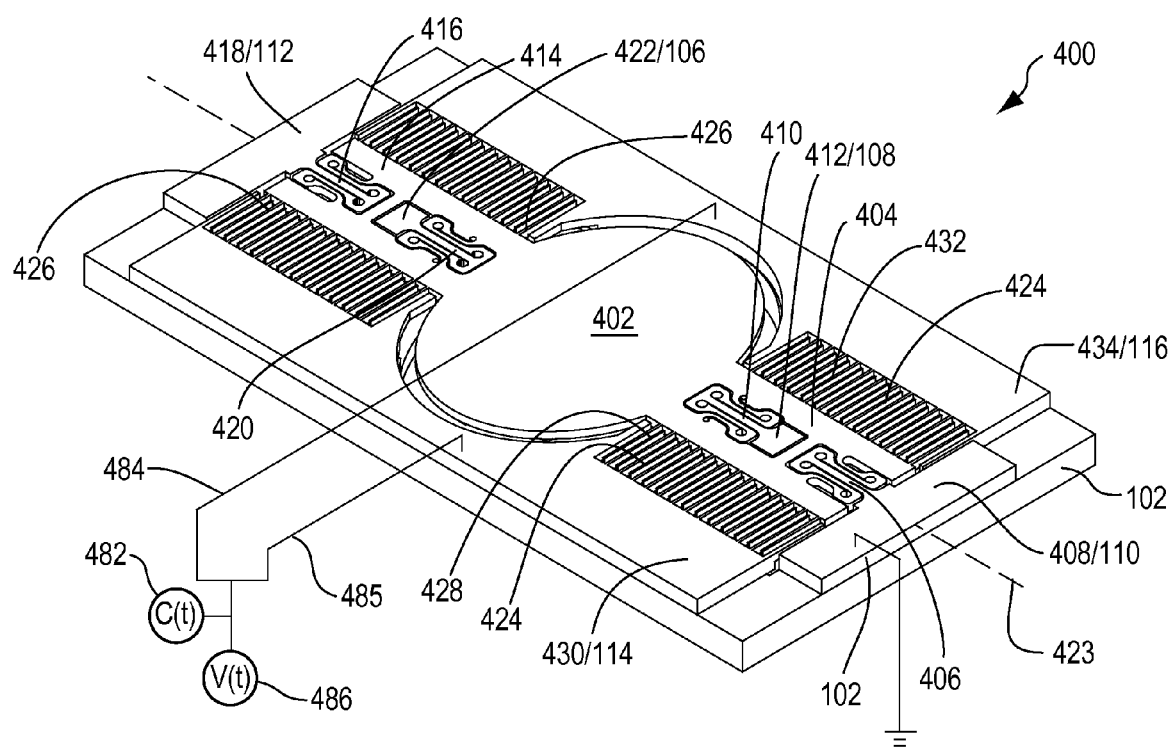

In FIG. 4, the backside of silicon wafer 102 (the topside of the bonded structure) is etched to approximately half of its thickness (or down to the optional etch stop) to define a device layer. The features on the backside of silicon wafer 102 are aligned directly with the features on the topside of silicon wafer 102. The etching system aligns the features on the backside of silicon wafer 102 by looking through glass substrate 202 for the features on the topside of silicon wafer 102.

Instead of being a glass wafer, wafer 202 may be an opaque and nonconductive wafer, such as a ceramic wafer or a silicon wafer with a top oxide layer. When wafer 202 is opaque, alignment is accomplished through one or more holes (e.g., mirror cavity 210) in wafer 202 that allows features on the topside on silicon wafer 102 to be visible so that features on the backside of silicon wafer 102 can be directly aligned with features on the topside of silicon wafer 102.

The device layer includes a mirror 402 having a first half connected to a proximal end of a beam structure 404. A distal end of beam structure 404 extends away from mirror 402 and is connected by a spring 406 to a spring pad 408 (formed above spring pad 110). Beam structure 404 is further connected by a spring 410 to a spring pad 412 (formed above spring pad 108). In one embodiment, spring 410 and spring pad 412 are located in an opening in beam structure 404.

Each spring can be a straight-shaped spring, a U-shaped spring, or a serpentine-shaped spring. In one embodiment, each spring has two serpentine sections and a straight section. Each serpentine section has one end joined to beam structure 404 and another end joined at the middle with the straight section, which in turn is joined a respective spring pad.

Mirror 402 has a second half connected to a proximal end of a beam structure 414. A distal end of beam structure 414 extends away from mirror 402 and is connected by spring 416 to a spring pad 418 (formed above spring pad 112). Beam structure 414 is further connected by a spring 420 to a spring pad 422 (formed above spring pad 106). In one embodiment, spring 420 and spring pad 422 are located in an opening in beam structure 414. Springs 416 and 420 may have the same construction as springs 406 and 410.

Springs 406, 410, 416, and 420 are arranged so their rotating axes are aligned along rotation axis 423 of mirror 402. This allows mirror 402 to rotate about rotation axis 423.

Long rotating comb teeth 424 extend from both sides of beam structure 404 while long rotating comb teeth 426 extend from both sides of beam structure 414. On one side of rotation axis 423, long rotating comb teeth 424 and 426 are interdigitated in-plane with long stationary comb teeth 428 extending from a stationary pad 430 toward rotation axis 423. These long rotating comb teeth 424 and 426 are also interdigitated out-of-plane at their tips with short stationary comb teeth 128 from the support layer below. On the other side of rotation axis 423, long rotating comb teeth 424 and 426 are interdigitated in-plane with long stationary comb teeth 432 extending from a stationary pad 434 toward rotation axis 423. These long rotating comb teeth 424 and 426 are also interdigitated out-of-plane at their tips with short stationary comb teeth 132 from the support layer below.

In one embodiment, the dimension that controls the etch rate of the backside of silicon wafer 102 is the gap between adjacent comb teeth, which is about 5 µm. If present, exposed portions of the optional insulator are removed after etching to free the moving elements so they can rotate about rotation axis 423. The structure release/insulator removal can be performed by wet hydrofluoric (HF) release or HF vapor release.

Figure 5:
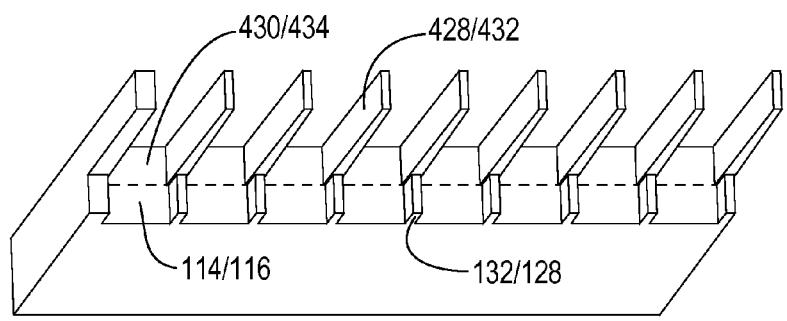
FIG. 5 illustrates an enlarged view of long stationary comb teeth formed above short stationary comb teeth in one embodiment of the invention.

FIG. 5 illustrates that long stationary comb teeth 428 and 432 are formed above short stationary comb teeth 128 and 132 so they are electrically coupled, and stationary pads 430 and 434 are formed above support pads 114 and 116 so they are electrically coupled.

The long rotating and stationary comb teeth form an actuator that rotates mirror 402 about rotation axis 423 when a voltage difference is applied between the long rotating and stationary comb teeth. Typically a varying voltage difference is applied between the long rotating and stationary comb teeth to oscillate mirror 402.

Note that long rotating comb teeth 424 and 426 correspond to the lateral surface of the oscillating body in U.S. Pat. No. 6,595,055, long stationary comb teeth 428 and 432 correspond to inner lateral surface of an opening in a frame layer in U.S. Pat. No. 6,595,055, and short stationary comb teeth 128 and 132 correspond to the supporting wafer for holding the frame layer in U.S. Pat. No. 6,595,055.

Short stationary comb teeth 128 and 132 create an initial deflection of mirror 402 from the resulting asymmetric electrostatic field with the top layer. The initial deflection can be used to start the oscillation of mirror 402. Thus, unlike U.S. Pat. No. 6,595,055, the support layer asserts a physical influence on the oscillating body.

Furthermore, the different lengths of short stationary comb teeth 128 and 132 (or the absence of short stationary comb teeth 128 and the presence of short stationary comb teeth 132) allows the rotation direction to be determined from capacitive measurements. Typically, the capacitance between the comb teeth correlates to the rotation angle of the mirror. If the overlap areas between the comb teeth are substantially the same in both rotation directions, then the current rotation direction cannot be determined form the capacitance measurements since the capacitance would be the same at the same angle in both directions. However, the different lengths of short stationary comb teeth 128 and 132 create asymmetrical overlaps between the comb teeth so that the capacitance is higher when mirror 402 is rotated in one direction. This allows both the rotation direction and the rotation angle to be determined from the capacitance measurements.

In one embodiment, long stationary comb teeth 428 and 432 receive an oscillating driving voltage (e.g., an AC voltage) from a voltage source 486 through at least one of leads 484 and 485 while long rotating comb teeth 424 and 426 receive a constant reference voltage (e.g., ground). A capacitance sensor 482 is coupled to one of leads 484 and 485 to sense the rotation angle and the rotation direction of mirror 402. This arrangement reduces the number of leads which would have to be provided if capacitance is sensed through additional electrodes that are electrically insulated from the long stationary comb teeth.

The rotation angle of mirror 402 can be determined in the following way. A driving current is measured at lead 484 that provides the oscillating voltage. A reactance is determined by dividing the known oscillating voltage by the measured driving current. In one embodiment, an additional frequency signal (e.g. 6 MHz) can be modulated into the driving frequency (e.g., 6 KHz) to improve the detection of the current and therefore the reactance. This additional frequency signal is much higher than the mirror resonant frequency so as to not interfere with the excitation of the mirror. A capacitance is then determined from the determined reactance. The determined capacitance is then correlated to the rotation angle. If the structure is not symmetrical, the determined capacitance would be different between a positive rotation angle and a negative rotation angle. An exemplary chip for driving the mirror and determining rotation angle of the mirror is described in an article entitled "Driver ASIC for synchronized excitation of resonant Micro-Mirrors" by Roscher et al., Proceedings of SPIE Vol. 4985 (2003).

Figure 6:
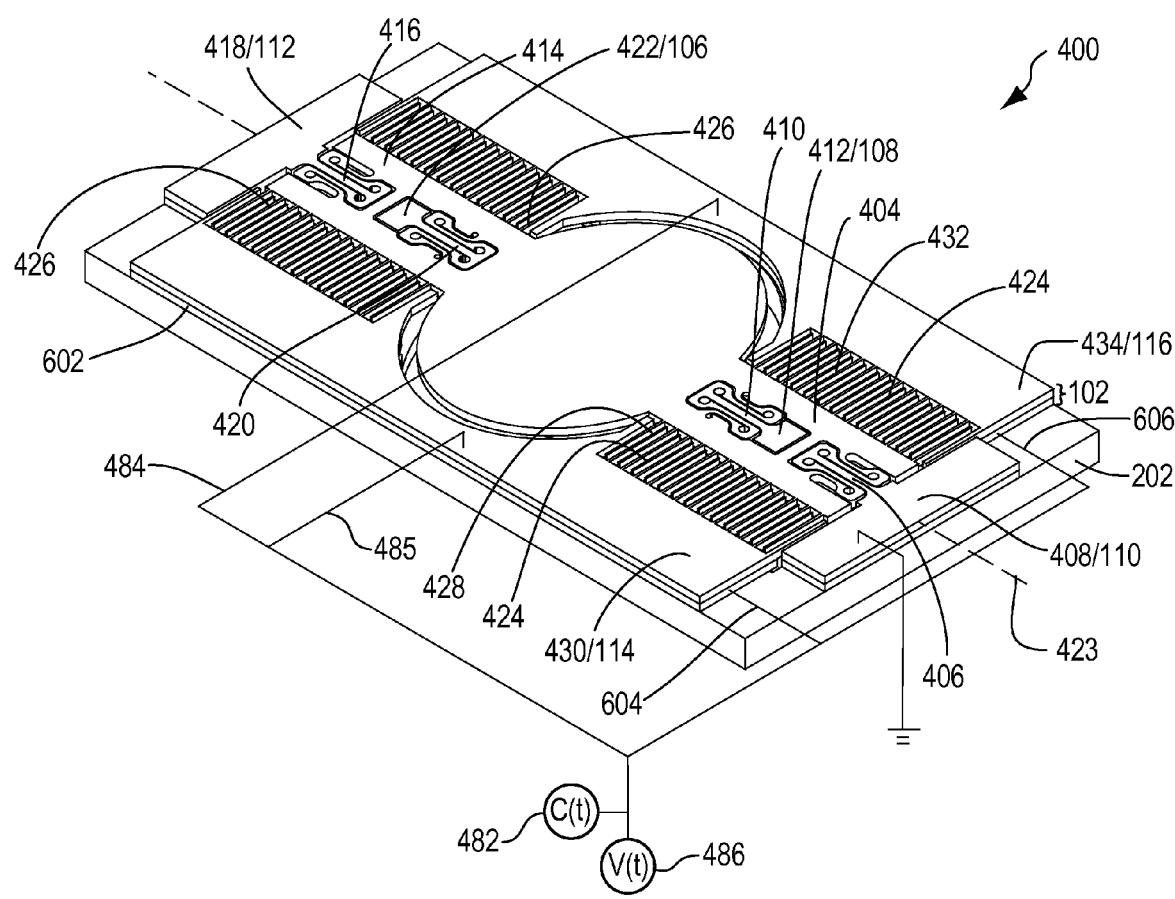
FIG. 6 illustrates a MEMS device constructed from a silicon-on-insulator (SOI) wafer using the processes of FIGS. 1A, 1B, 1C, 2, 3, and 4 in one embodiment of the invention.

FIG. 6 illustrates a device 400 where wafer 102 is a silicon-on-insulator (SOI) wafer in one embodiment of the invention. The fabrication of MEMS device 400 remains the same as described above but the resulting device has an insulator layer 602 between the components of the device layer and the first support layer. For example, the topside of SOI wafer 102 is etched down to the insulator (e.g., silicon oxide) to form the first support layer. SOI wafer 102 is then turned upside down and bonded with glass wafer 202, which forms a second support layer. The backside of SOI wafer 102, now the topside of the bonded structure, is then etched down to the insulator to form the device layer. Note that long stationary comb teeth 428/432 and short stationary comb teeth 128/132 are now electrically insulated from each other, and stationary pads 430/434 and support pads 114/116 are now electrically insulated from each other.

Figure 7:
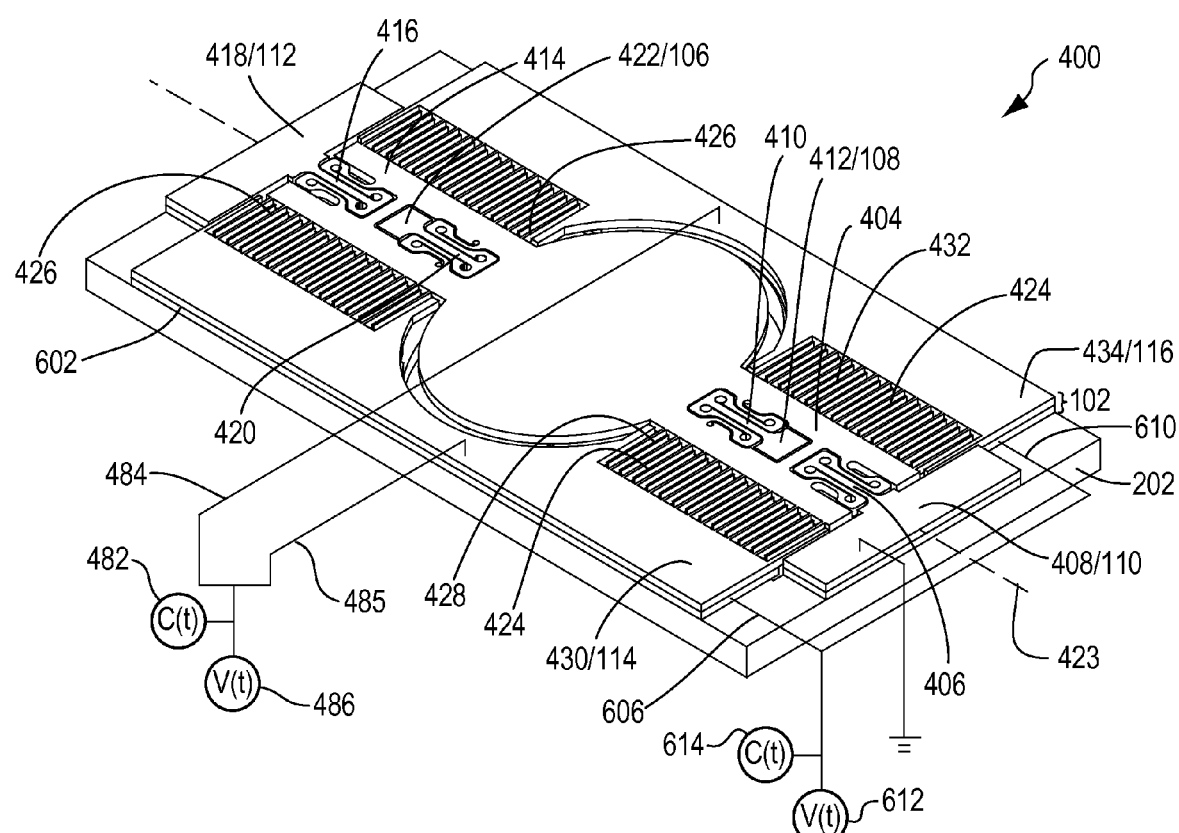
FIG. 7 illustrates the MEMS device of FIG. 6 with an alternative setup for voltage sources and directional sensors in one embodiment of the invention.

Short stationary comb teeth 128 and 132 can be coupled by leads 604 and 606 to voltage source 486. Capacitance sensor 482 is coupled to at least one of leads 484, 485, 604, and 606 to detect the rotation angle and the rotation direction. Alternatively, as shown in FIG. 7, short stationary comb teeth 128 and 132 can be coupled by leads 608 and 610 to a separate voltage source 612. An additional capacitance sensor 614 is coupled to at least one of leads 606 and 610 to detect the rotation direction while capacitance sensor 482 is used to detect the rotation angle. Voltage source 612 may provide a constant reference voltage (e.g., a DC voltage) or an oscillating voltage (e.g., an AC voltage) at a much higher frequency than the mirror resonant frequency.

Various other adaptations and combinations of features of the embodiments disclosed are within the scope of the invention.

The invention claimed is:

1. A method for forming a MEMS (micro-electro-mechanical system) device, comprising:
   etching a first surface of a device wafer to form:
      a plurality of first spring pads;
      a first support pad on a first side of a rotational axis; and
      a plurality of first short stationary comb teeth extending from the first support pad toward the rotational axis;
   etching a second surface of the device wafer to form:
      a mirror;
      first and second beam structures, each connected at a respective proximal end to the mirror and extending to a respective distal end spaced from the mirror;
      a plurality of second spring pads, wherein the second spring pads and the first spring pads at least partially overlap;
      a plurality of springs coupling the first and the second beam structures to the second spring pads along the rotational axis so the mirror can rotate about the rotational axis;
      a first stationary pad on the first side of the rotational axis, wherein the first stationary pad and the first support pad at least partially overlap;
      a plurality of first long stationary comb teeth extending from the first stationary pad toward the rotational axis, wherein the first long stationary comb teeth and the first short stationary comb teeth at least partially overlap;
      a plurality of first long rotating comb teeth extending from a first edge of the first and the second beam structures toward the first long stationary comb teeth, the first long rotating comb teeth being interdigitated out-of-plane at their tips with the first short stationary comb teeth, the first long rotating comb teeth being interdigitated in-plane substantially along their lengths with the first long stationary comb teeth.

2. The method of claim 1, wherein:
   the device wafer is a silicon wafer with a single crystal layer;
   said etching a first surface of a device wafer comprises etching a first half of the device wafer;
   said etching a second surface of the device wafer comprises etching a second half of the device wafer; and
   the first long stationary comb teeth and the short stationary comb teeth are electrically coupled.

3. The method of claim 1, wherein:
   the device wafer is a silicon-on-insulator (SOI) wafer;
   said etching a first surface of a device wafer comprises etching the first surface down to an insulator layer of the SOI wafer;
   said etching a second surface of the device wafer comprises etching the second surface down to the insulator layer; and
   the first long stationary comb teeth and the short stationary comb teeth are electrically insulated.

4. The method of claim 1, wherein:
   said etching a first surface further forms:
      a second support pad on a second side of the rotational axis; and
      a plurality of second short stationary comb teeth extending from the second support pad toward the rotational axis; and
   said etching a second surface further forms:
      a second stationary pad on the second side of the rotational axis, the second stationary pad and the second support pad at least partially overlap;
      a plurality of second long stationary comb teeth extending from the second stationary pad toward the rotational axis, wherein the second long stationary comb teeth and the second short stationary comb teeth at least partially overlap; and
      a plurality of second long rotating comb teeth extending from a second edge of the first and the second beam structures toward the second long stationary comb teeth, the second long rotating comb teeth being interdigitated out-of-plane at their tips with the second short stationary comb teeth, the second long rotating comb teeth being interdigitated in-plane substantially along their lengths with the second long stationary comb teeth.

5. The method of claim 4, wherein the first short stationary comb teeth and the second short stationary comb teeth are different in length.

6. The method of claim 5, wherein the first short stationary comb teeth and the first long stationary comb teeth are electrically coupled, and the second short stationary comb teeth and the second long stationary comb teeth are electrically coupled, the method further comprising:
   coupling a sensor to a lead to at least one of the first short stationary comb teeth, the second short stationary comb teeth, the first long stationary comb teeth, and the second long stationary comb teeth to detect at least one of a rotation angle and a rotation direction of the mirror;
   coupling a driving voltage source to the lead to rotate the mirror; and
   coupling a reference voltage source to the first and the second long rotating comb teeth.

7. The method of claim 5, wherein the first short stationary comb teeth and the first long stationary comb teeth are electrically insulated, and the second short stationary comb teeth and the second long stationary comb teeth are electrically insulated, the method further comprising:
   coupling a first sensor to a first lead to at least one of the first short stationary comb teeth and the second short stationary comb teeth to detect a rotation direction of the mirror;
   coupling a second sensor to a second lead to at least one of the first long stationary comb teeth and the second long stationary comb teeth to detect a rotation angle of the mirror;
   coupling a first voltage source to the first lead;
   coupling a second voltage source to the second lead to rotate the mirror; and
   coupling a reference voltage source to the first and the second long rotating comb teeth.

8. The method of claim 1, further comprising a step selected from the group consisting of:
   prior to said etching a second surface of the device wafer, bonding the first surface of the device wafer to a surface of a support wafer; and after said etching a second surface of the device wafer, bonding the first surface of the device wafer to the surface of the support wafer.

9. The method of claim 8, prior to said bonding, further comprising processing the support wafer to form a plurality of support pads on the support wafer, wherein said bonding further comprises bonding the first spring pads to the support pads on the support wafer.

10. The method of claim 9, wherein said processing the support wafer further forms a recess in the support wafer and a cavity through the recess, at least one of the support pads is located in the recess, the mirror in the device wafer is located opposite the cavity in the support wafer.

11. The method of claim 10, wherein said processing the support wafer comprises a process selected from the group consisting of sandblasting, laser cutting, wet etching, and dry etching.

12. The method of claim 11, wherein:
said etching a first surface of the device wafer further forms a stiffening structure comprising crossbeams, the crossbeams being located opposite the cavity and the recess in the support wafer; and
the mirror and the first and the second beam structure on the second surface of the device wafer overlapping the crossbeams on the first surface of the device wafer.

13. The method of claim 1, wherein said etching a first surface of the device wafer further forms a plurality of additional springs at least partially overlapping with the springs, the additional springs coupling the first and the second beam structures to the first spring pads.

14. A MEMS (micro-electro-mechanical system) device, comprising:
a support wafer;
a device wafer having a surface bonded to a surface of the support wafer, the device wafer comprising:
a first half proximate to the support wafer, the first half comprising:
a plurality of first spring pads;
a first support pad on a first side of a rotational axis; and
a plurality of first short stationary comb teeth extending from the first support pad toward the rotational axis;
a second half distant to the support wafer, the second half comprising:
a mirror;
first and second beam structures, each connected at a respective proximal end to the mirror and extending to a respective distal end spaced from the mirror;
a plurality of second spring pads, the second spring pads and the first spring pads at least partially overlap;
a plurality of springs coupling the first and the second beam structures to the second spring pads; and
a first stationary pad on the first side of the rotational axis, wherein the first stationary pad and the first support pad at least partially overlap;
a plurality of first long stationary comb teeth extending from the first stationary pad toward the rotational axis, wherein the first long stationary comb teeth and the first short stationary comb teeth partially overlap;
a plurality of first long rotating comb teeth extending from a first edge of the first and the second beam structures toward the first long stationary comb teeth, the first long rotating comb teeth being interdigitated out-of-plane at their tips with the first short stationary comb teeth, the first long rotating comb teeth being interdigitated in-plane substantially along their lengths with the first long stationary comb teeth.

15. The device of claim 14, wherein the device wafer is a silicon wafer with a single crystal layer and the first long stationary comb teeth and the short stationary comb teeth are electrically coupled.

16. The device of claim 14, wherein the device wafer is a silicon-on-insulator (SOI) wafer and the first long stationary comb teeth and the short stationary comb teeth are electrically insulated by an insulator layer in the SOI wafer.

17. The device of claim 14, wherein:
the first half of the device wafer further comprises:
a second support pad on a second side of the rotational axis; and
a plurality of second short stationary comb teeth extending from the second support pad toward the rotational axis; and
the second half of the device wafer further comprises:
a second stationary pad on the second side of the rotational axis, the second stationary pad and the second support pad at least partially overlap;
a plurality of second long stationary comb teeth extending from the second stationary pad toward the rotational axis, wherein the second long stationary comb teeth and the second short stationary comb teeth partially overlap; and
a plurality of second long rotating comb teeth extending from a second edge of the first and the second beam structures toward the second long stationary comb teeth, the second long rotating comb teeth being interdigitated out-of-plane at their tips with the second short stationary comb teeth, the second long rotating comb teeth being interdigitated in-plane substantially along their lengths with the second long stationary comb teeth.

18. The device of claim 17, wherein the first short stationary comb teeth and the second short stationary comb teeth are different in length.

19. The device of claim 18, wherein the first short stationary comb teeth and the first long stationary comb teeth are electrically coupled, and the second short stationary comb teeth and the second long stationary comb teeth are electrically coupled, the device further comprising:
a sensor coupled to a lead to at least one of the first short stationary comb teeth, the second short stationary comb teeth, the first long stationary comb teeth, and the second long stationary comb teeth to detect at least one of a rotation angle and a rotation direction of the mirror;
a voltage source coupled to the lead to rotate the mirror; and
a reference voltage source coupled to the first and the second long rotating comb teeth.

20. The device of claim 18, wherein the first short stationary comb teeth and the first long stationary comb teeth are electrically insulated, and the second short stationary comb teeth and the second long stationary comb teeth are electrically insulated, the device further comprising:
a first sensor coupled to a first lead to at least one of the first short stationary comb teeth and the second short stationary comb teeth to detect a rotation direction of the mirror;

a second sensor coupled to a second lead to at least one of the first long stationary comb teeth and the second long stationary comb teeth to detect a rotation angle of the mirror;

a first voltage source coupled to the first lead;

a second voltage source coupled to the second lead to rotate the mirror; and a reference voltage source coupled to the first and the second long rotating comb teeth.

21. The device of claim 14, wherein the support wafer comprises a plurality of support pads bonded to the first spring pads on the first surface of the device wafer.

22. The device of claim 21, wherein the support wafer further comprises a recess and a cavity through the recess, at least one of the support pads being located in the recess, the mirror in the device wafer being located opposite the cavity in the support wafer.

23. The device of claim 21, wherein:

the first half of the device wafer further comprises a stiffening structure comprising crossbeams, the crossbeams being located opposite the cavity and the recess in the support wafer; and the mirror and the first and the second beam structure on the second half of the device wafer overlapping the crossbeams on the first half of the device wafer.

24. The device of claim 14, wherein the first half of the device wafer further comprises a plurality of additional springs at least partially overlapping with the springs, the additional springs coupling the first and the second beam structures to the first spring pads.

* * * * *